United States Patent [19]

Ohhata

[11] Patent Number: 4,459,512
[45] Date of Patent: Jul. 10, 1984

[54] CATHODE-RAY DISPLAY TUBE FOR COLOR PRINTERS

[75] Inventor: Shuichi Ohhata, Tokyo, Japan

[73] Assignee: Yokogaw Hokushin Electric Corp., Tokyo, Japan

[21] Appl. No.: 301,391

[22] Filed: Sep. 11, 1981

[30] Foreign Application Priority Data

Sep. 22, 1980 [JP] Japan ................. 55-131910

[51] Int. Cl.³ .............. H01J 29/20; H01J 29/32
[52] U.S. Cl. ...................... 315/10; 313/468; 346/110 R; 358/69
[58] Field of Search ............. 313/467, 468; 346/110 R; 354/6; 355/20; 315/10, 377, 375; 358/69

[56] References Cited

U.S. PATENT DOCUMENTS

| | | | |
|---|---|---|---|
| 2,733,164 | 1/1956 | Smith | 313/467 |
| 2,862,130 | 11/1958 | Sadowsky et al. | 313/467 |
| 3,308,326 | 3/1967 | Kaplan | 313/467 |
| 3,723,787 | 3/1973 | Blasse et al. | 313/468 |
| 3,767,954 | 10/1973 | Van Den Avoort | 315/10 |
| 4,067,650 | 1/1978 | Spence-Bate | 355/20 |

OTHER PUBLICATIONS

Folkerts et al., "Photography of Cathode-Ray-Tube Traces", RCA Review, VI, (2), Oct. 1941, pp. 234-244.

Primary Examiner—Alfred E. Smith
Assistant Examiner—Carolyn E. Fields
Attorney, Agent, or Firm—Parmelee, Bollinger & Bramblett

[57] ABSTRACT

A cathode-ray display tube for color printers has a phosphor screen comprises a blue-emitting phosphor having a maximum ability of color emission in the range of wavelengths of 480 m$\mu$ and below with a radiant energy in the range of wavelengths of about 480 m$\mu$ and higher being 10% or less of the overall radiant energy; a green-emitting phosphor having a maximum ability of color emission in the range of wavelengths of 520 through 570 m$\mu$ with a radiant energy in the range of wavelengths of about 500 m$\mu$ and less and of about 630 m$\mu$ and higher being 5% or less of the overall radiant energy; and a red-emitting phosphor having a maximum ability of color emission in the range of wavelengths of 630 through 750 m$\mu$ with a radiant energy in the range of wavelengths of about 590 m$\mu$ and less being about 10% or less of the overall radiant energy.

Phosphor dots located beyond the area of normal raster are sensed to provide timing signals for controlling beam deflection.

6 Claims, 13 Drawing Figures

CATHODE-RAY DISPLAY TUBE FOR COLOR PRINTERS

BACKGROUND OF THE INVENTION

1. Field of the Invention

The present invention relates to a cathode-ray display tube (hereinafter referred to as "CRT") for use with color printers, and more particularly to a CRT for use with color printers which has a display screen composed of three stripes of phosphor film which correspond to primary colors of red (R), green(G), and blue (B).

2. Prior Art

There has heretofore been known a CRT for color printers in which a light spot on the phosphor screen changes in position and color in response to input signals supplied for exposing photosensitive color paper to the light spot, the CRT being used for color facsimile and the like. The CRT utilizes, as with an ordinary CRT for color television sets, a blue-emitting phosphor, green-emitting phosphor, and a red-emitting phosphor for producing desired colors, and has a light-emitting characteristic as illustrated in FIG. 1 of the accompanying drawings. The graph of FIG. 1 has a horizontal axis respresenting wavelengths and a vertical axis representing relative intensities. Ordinary photosensitive color paper now available in quantities in the market inexpensively has a typical photosensitivity characteristic as illustrated in FIG. 2 of the accompanying drawings. A review of FIGS. 1 and 2 indicates that the light-emitting characteristic of the phosphors on CRT differs widely from the photosensitivity characteristic of the photosensitive paper. When the photosensitive paper is exposed to an image produced on CRT using such phosphors for color television, no picture image having a tone close to the original one will be reproduced on the color paper. As shown in FIG. 2, the ordinary color paper has widely different sensitivities to colors, a property which has prevented well-toned picture images from being reproduced on the paper.

SUMMARY OF THE INVENTION

It is an object of the present invention to provide a CRT for use with color printers which is capable of printing colored picture images of high tone fidelity and good quality on inexpensive ordinary photosensitive color paper having a photosensitivity characteristic as shown in FIG. 2.

Another object of the present invention is to provide a CRT for enabling a beam of electrons to be deflected or scanned properly at all times for obtaining picture images that are free of distortions.

A CRT according to the present invention resides in the provision of phosphors having color-emitting characteristics which are substantially in conformity with a photosensitivity characteristic of ordinary photosensitive color paper.

The above and other objects, features and advantages of the present invention will become more apparent from the following description when taken in conjunction with the accompanying drawings in which some preferred embodiments of the present invention are shown by way of illustrative example.

DESCRIPTION OF THE PREFERRED EMBODIMENTS

Figure 1:
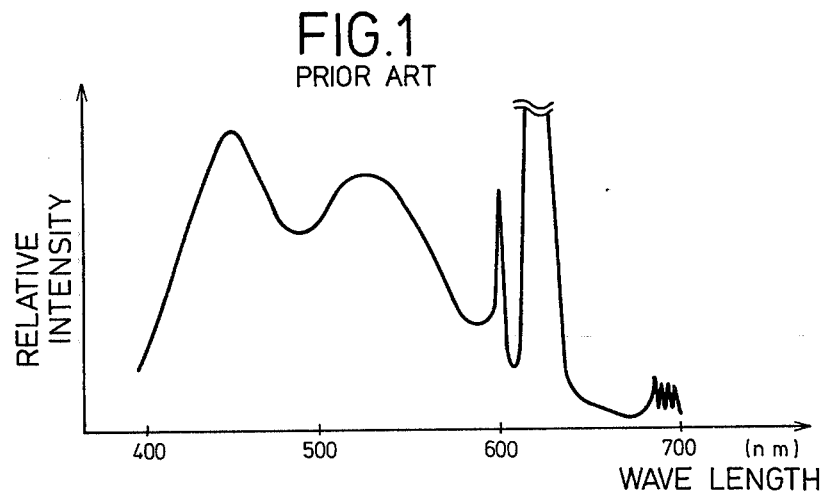
FIG. 1 is a graph showing relative intensities of colors at various wavelengths thereof which can be produced by phosphors on a conventional CRT for color television.
Figure 2:
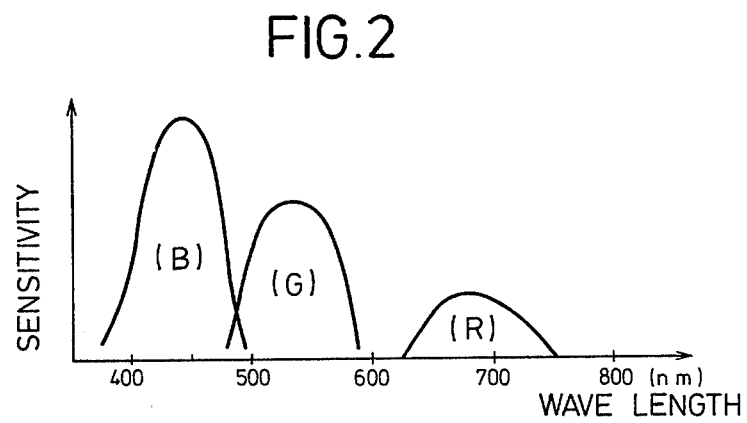
FIG. 2 is a graph indicative of a photosensitivity characteristic of known ordinary photosensitive color paper.

Prior to detailed description of embodiments of the present invention, the photosensitivity characteristic of inexpensive ordinary photosensitive color paper will be described with reference to FIG. 2. Such ordinary photosensitive color paper comprises (i) a photosensitive material having a sensitivity in the range of wavelengths shorter than 480 through 500 m$\mu$ and a maximum sensitivity in the range of wavelengths in the vicinity of 420 through 450 m$\mu$ for producing yellow through proper exposure in such wavelength range and subsequent development, (ii) a photosensitive material having a sensitivity in the range of wavelengths of about 480 through 590 m$\mu$ and a maximum sensitivity in the range of wavelengths of 520 through 570 m$\mu$ for producing magenta through proper exposure and subsequent development, and (iii) a photosensitive material having a sensitivity in the range of wavelengths of about 630 through 750 m$\mu$ and a maximum sensitivity in the range of wavelengths in the vicinity of 680 through 720 m$\mu$ for producing cyan through proper exposure and subsequent development.

Figure 3:
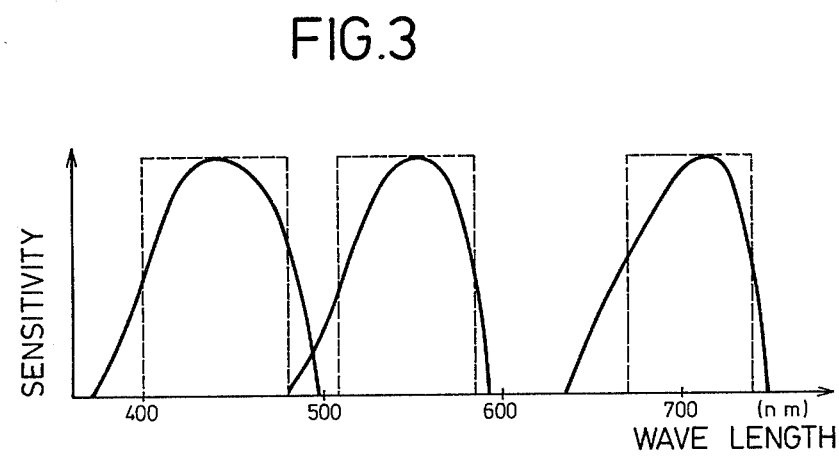
FIG. 3 is a graph showing an ideal light-emitting characteristic of CRT phosphors.

An ideal CRT for enabling picture images to be reproduced on such ordinary photosensitive color paper should have color-emitting peaks (indicated by the dotted lines in FIG. 3) which cause no radiation to adjacent peaks and overlap the maximum sensitivity wavelength regions (indicated by the solid lines) which the ordinary color paper has. The colors in the three regions (upper, intermediate and lower) can easily be adjusted in shade by controlling the brightness of a light spot on the display screen or a current supplied to the anode of an electric gun in CRT.

Figure 4:
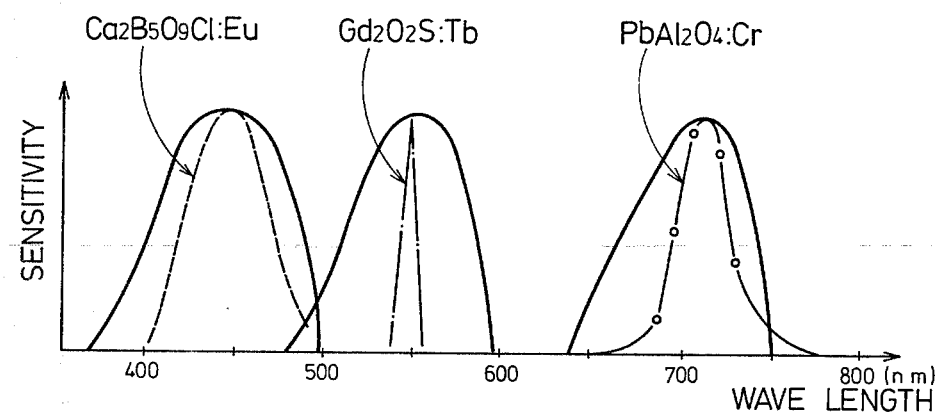
FIG. 4 is a graph of a color-emitting characteristic of a CRT for color printers in accordance with the present invention.

FIG. 4 is indicative of a color-emitting characteristic of a CRT according to the present invention, with photosensitivity curves of color paper being shown by the solid lines. Such CRT of the present invention employs a phosphor screen comprising a blue-emitting phosphor of $Ca_2B_5O_9Cl:Eu$ having a maximum ability of color emission in the range of wavelengths of 400 m$\mu$ through 480 m$\mu$ with a radiant energy in the range of wavelengths of about 480 m$\mu$ and higher being about 10% or less of the overall radiant energy, a greenemitting phosphor of $Gd_2O_2S:Tb$ having a maximum ability of color emission in the range of wavelengths of about 520 through 570 m$\mu$ with a radiant energy in the range of wavelengths of about 500 m$\mu$ and less and of about 630 m$\mu$ and higher being about 5% or less of the overall radiant energy, and a red-emitting phosphor having a maximum ability of color emission in the range of wavelengths of about 630 through 750 m$\mu$ with a radiant energy in the range of wavelengths of about 590 m$\mu$ and less being about 10% or less of the overall radiant energy.

Figure 5:
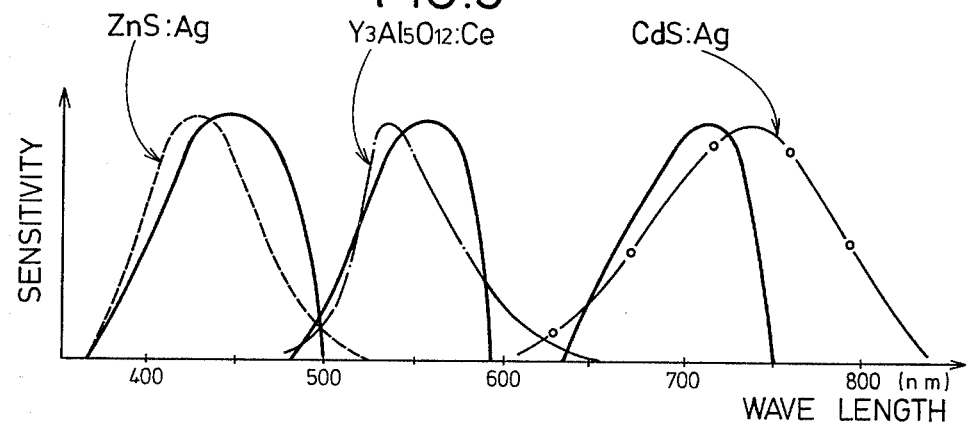
FIGS. 5 through 7 are graphs of color-emitting characteristics of CRTs constructed in accordance with other embodiments of the present invention.

FIG. 5 shows a color-emitting characteristic of a CRT according to another embodiment. The CRT has a phosphor screen comprising a blue-emitting phosphor of $ZnS:Ag$, a green-emitting phosphor of $Y_3Al_5O_{12}:Ce$, and a red-emitting phosphor of $CdS:Ad$.

Figure 6:
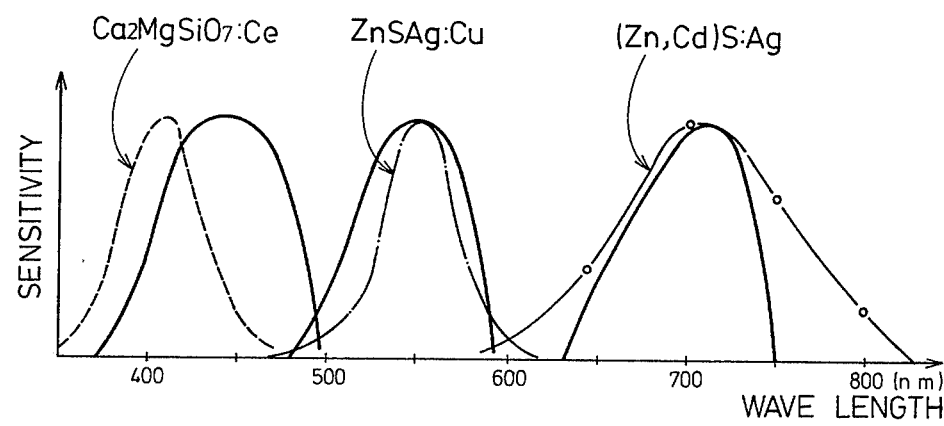

FIG. 6 is illustrative of a color-emitting characteristic of a CRT in accordance with still another embodiment. The CRT has a phosphor screen comprising a blue-emitting phosphor of $Ca_2MgSiO_7:Ce$, a green-emitting phosphor of $ZnSAg:Cu$, and a red-emitting phosphor of $(Zn,Cd)S:Ag$ has ZnS which should preferably have a mole ratio of 20% or less.

Figure 7:
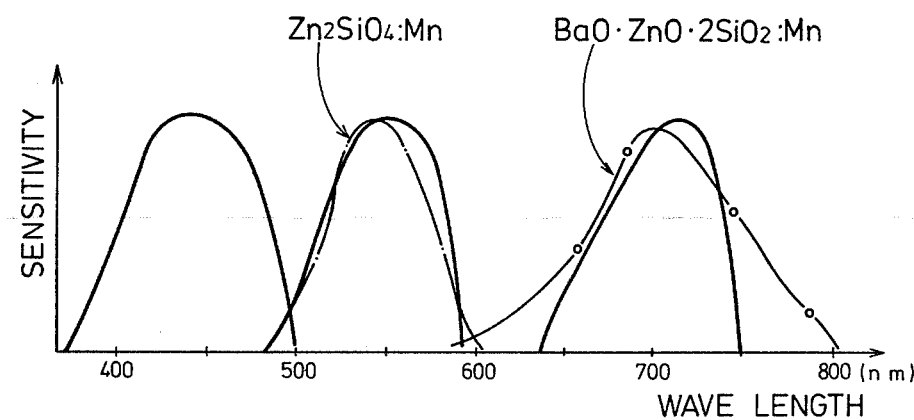

According to still another embodiment, a CRT has a color-emitting characteristic as shown in FIG. 7 and employs a phosphor screen comprising a blue-emitting phosphor of $Ca_2B_5O_9Cl:Eu$ or $ZnS:Ag$ or $Ca_2MgSiO_7:Ce$, a green-emitting phosphor of $Zn_2SiO_4:Mu$, and a red-emitting phosphor of $BaO.ZnO.2SiO_2:Mn$. As an alternative, there may be used a blue-emitting phosphor of $CaB_5O_9Cl:Eu$, a green-emitting phosphor of $Y_3Al_5O_{12}:Ce$, and a red-emitting phosphor of $(Zn,Cd)S:Ag$.

For high-speed color printing operation, the foregoing phosphors should have a phosphorescence time of about 10 ms or shorter. (The phosphorescence time is an interval of time which is required for the intensity of luminescence upon electron bombardment to be reduced to 1/10.)

Figure 8:
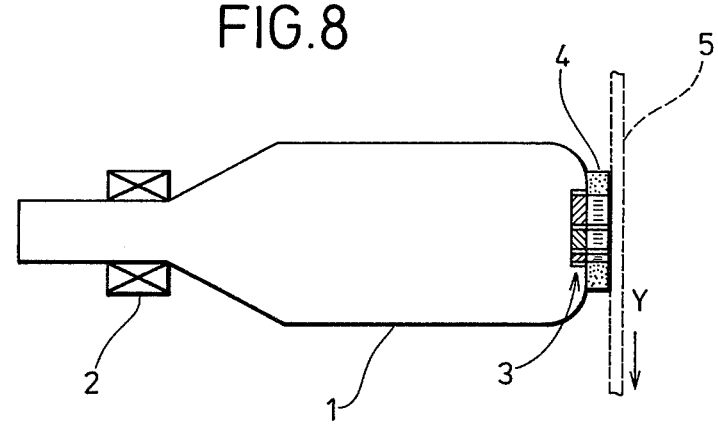
FIG. 8 is a cross-sectional view of a CRT designed to compensate for different sensitivities to colors of ordinary photosensitive color paper.
Figure 9:
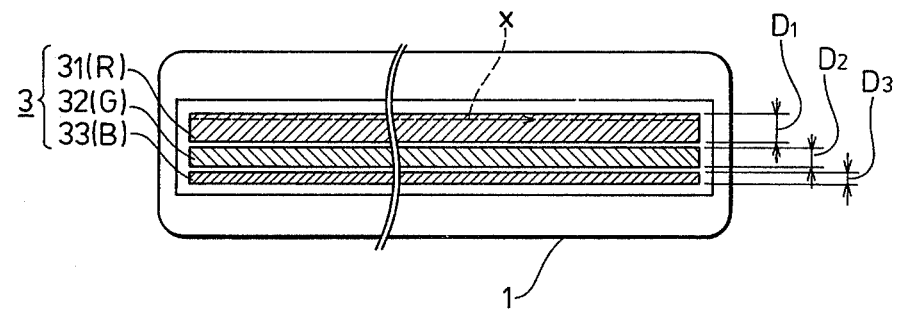
FIG. 9 is a front elevational view of CRT shown in FIG. 8.

An CRT according to the present invention comprises a tube 1, a coil 2 for deflecting a beam of electrons, and a display screen 3 for emitting colors when it is bombarded with electrons. As shown in FIG. 8, plate 4 of optical fiber glass is mounted on the display screen 3 so as to cover the latter. A sheet 5 of photosensitive color paper is fed along at a constant speed in the direction of the arrow Y over the plate 4. As shown in FIG. 9, the display screen 3 includes three stripes 31,32,33 of phosphor films which correspond to red (R), green (G), and blue (B), respectively. The phosphor stripes 31,32,33 have widths $D_1,D_2,D_3$, respectively, in the direction of travel of the color sheet 5, that is, in a direction normal to the direction X in which the phosphor screen 3 is scanned with a beam of electrons. The widths $D_1,D_2,D_3$ are selected so that the CRT will be used with ordinary color paper having a photosensitivity characteristic as illustrated in FIG. 2. More specifically, the width $D_1$ of the red-emitting phosphor stripe 31 is large so as to compensate for the R region having a low sensitivity. The green-emitting phospher stripe 32 corresponding to the G region has the width $D_2$ which is smaller than the width $D_1$. The width $D_3$ of the blue-emitting phosphor stripe 33 corresponding to the B region is smallest. Thus, the widths $D_1,D_2,D_3$ meet a relationship of $D_1>D_2>D_3$. The phosphors used as the strips on the CRT screen 3 shown in FIGS. 8 and 9 have color-emitting characteristics illustrated in FIGS. 4 through 7.

With the widths of the phosphor stripes for the primary colors being so selected that the stripe for a low-sensitivity color is wide and the stripe for a high-sensitivity color is narrow, the number of electron beam scanning lines is larger on the wider phosphor film 31 and is smaller on the narrower phosphor film 33 for effective compensation for different sensitivities to colors of the photosensitive color paper.

The CRT thus constructed can therefore print picture images of high tone fidelity and good quality on ordinary photosensitive color paper which is available inexpensively.

Figure 10:
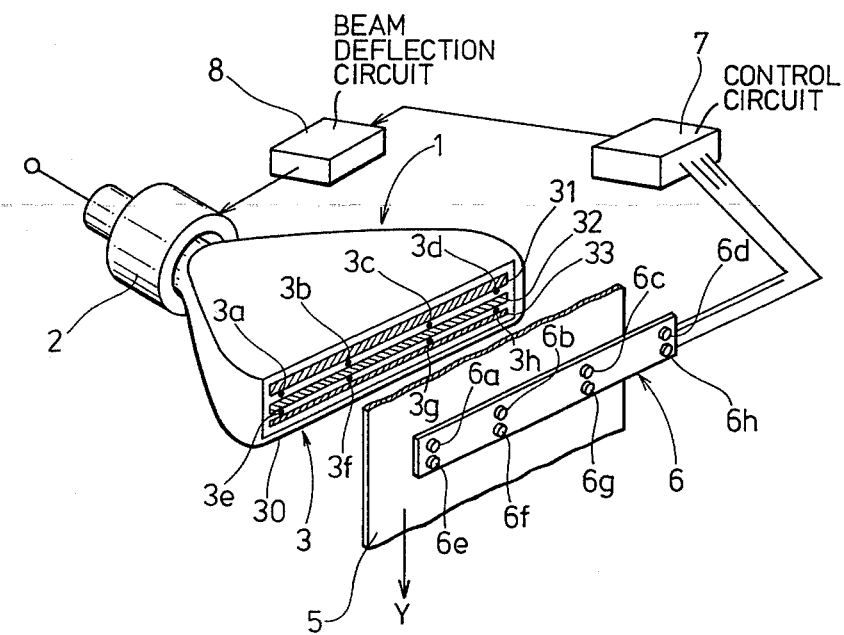
FIG. 10 is a perspective view of a CRT designed to enable a beam of electrons to be deflected properly at all times.

A CRT shown in FIG. 10 is designed to enable a beam of electrons to be deflected to scan a display screen properly at all times. The CRT has phosphor dots 3a to 3h located out of the area of a normal raster and between the phosphor stripes 31,32 and between the phosphor stripes 32,33, and each spaced at regular intervals from the other for detecting the position of a raster. The dots 3a through 3h are formed of a phosphor such for example as $Y_2O_3:Eu$ for producing a color in a region of wavelengths to which ordinary color paper in not sensitive. While in the illustrated embodiment two sets of four phosphor dots are positioned respectively between the phosphor stripes 31,32 and between the phosphor stripes 32,33, at least a total of two such phosphor dots may be located in an upper zone adjacent to the phosphor stripe 31 and in a lower zone adjacent to the phosphor stripe 33. Instead of the phosphor dots, the ends of the phosphor stripes may be utilized for monitoring the way in which the raster is produced.

The CRT of FIG. 10 is associated with a back plate 6 for holding a sheet 5 of photosensitive color paper against the CRT display screen 3 while permitting the sheet 5 to move thereon. The back plate 6 has photoelectric converters 6a through 6h corresponding in position to the phosphor dots 3a through 3h, respectively, on the CRT phosphor screen 3 for detecting light spots on the phosphor dots 3a through 3h through the color paper 5. The photoelectric converters 6a through 6h may be provided on the phosphor dots 3a through 3h, respectively. The photoelectric converters 6a through 6h produce timing signals which are supplied to a control circuit 7 which controls an electron beam deflection circuit 8. The control circuit 7 comprises a microprocessor including a memory and having a counting function.

The CRT of FIG. 10 will operate as follows: A beam of electrons in the CRT is first swept to scan the phosphor screen 3 at the phosphor dots 3a through 3d, which, upon electron bombardment, are excited to emit light, whereupon the corresponding photoelectric converters 6a through 6d generate pulse signals with a timing which is the same as that for raster scanning. When the phosphor dots 3e through 3h are scanned with an electron beam, pulse signals are produced by the photoelectric converters 6e through 6h with the same timing as that for raster scanning. The control circuit 7 is supplied successively with timing pulses from the photoelectric converters 6a through 6h. The way in which the raster is scanned can be determined by existence or nonexistence of such pulses, intervals between the pulses, and variations in such intervals.

Figure 11:
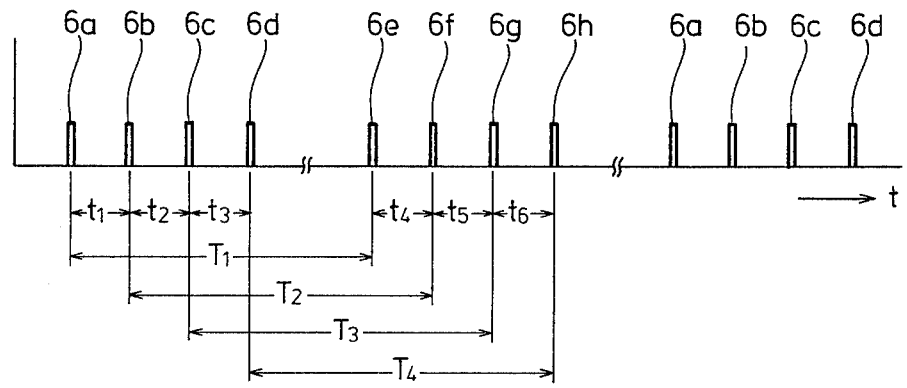
FIG. 11 is a view of waveforms of pulses generated when CRT of FIG. 10 is in operation.

FIG. 11 shows the waveforms of the pulses supplied from the photoelectric converters $6a$ through $6h$, the pulses being denoted by the reference characters of the converters from which they are produced, respectively.

When raster scanning is effected properly in both horizontal and vertical directions, intervals $t_1, t_2, t_3, t_4, t_5, t_6$ between the adjacent pulses are equal to each other, and intervals $T_1, T_2, T_3, T_4$ respectively between to pulses $6a, 6e$, the pulses $6b, 6f$, the pulses $6c, 6g$, and the pulses $6d, 6h$ are equal to each other. When raster scanning is not effected properly in the horizontal direction, then the intervals $t_1, t_2, t_3, t_4, t_5, t_6$ become unequal. With improper raster scanning in the vertical direction, the intervals $T_1, T_2, T_3, T_4$ are no longer the same as each other. Where $t_1 > t_2 > t_3$ and $t_4 > t_5 > t_6$, a picture image produced on the phosphor screen 3 is enlarged at the phosphor dot $3a$ and contracted at the phosphor dot $3d$. With $t_1 < t_2 < t_3$ and $t_4 < t_5 < t_6$, the picture image is contracted at the phosphor dot $3a$ and enlarged at the phosphor dot $3d$.

The memory in the control circuit 7 stores control signals indicative of conditions in which the raster is generated on the CRT screen 3 in terms of pulses delivered from the photoelectric converters $6a$ through $6h$. The electron beam deflection circuit 8 is responsive to such control signals from the memory for controlling circuit constants of its own to adjust the period and linearity of the waveform of a sawtooth signal applied to the deflection coil 2, whereby raster scanning can be carried out properly at all times.

While in the illustrated embodiment raster scanning is checked for correctiveness each time the screen is scanned, raster scanning may be checked at intermittent intervals. Light spots on the phosphor dots may be detected interiorly of the CRT tube 1. While in the foregoing embodiment raster scanning is checked in terms of intervals between timing pulses, the phosphor dots may have an increased area and raster scanning may be checked in terms of differences between and additions of the magnitudes of outputs from photoelectric converters located in confronting relation to the phosphor dots.

With the CRT constructed as illustrated in FIG. 10, a beam of electrons can be deflected properly at all times for correct raster scanning to produce picture images of good quality.

Figure 12:
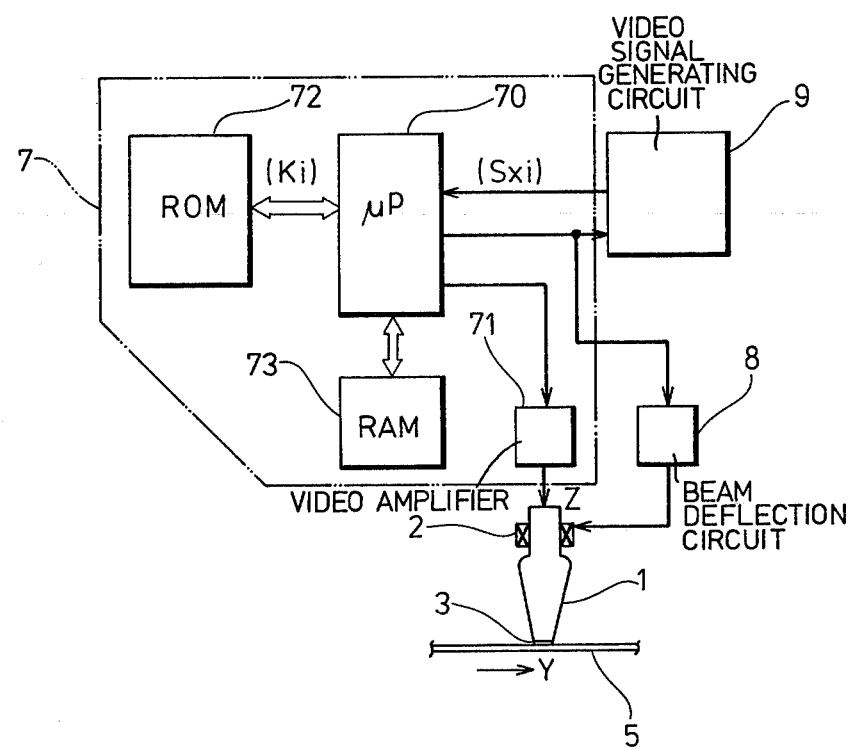
FIG. 12 is a block diagram of a driver circuit.

FIG. 12 illustrates a driver circuit for driving a CRT to create picture images free of irregularities in shade thereof in a direction of travel of a light spot by compensating for uneven coating of phosphors for three primaries which a CRT display screen is composed of.

The driver circuit shown in FIG. 12 divides in a horizontal direction and memorizes in advance the intensities (or efficiencies) of light emission from the phosphor films on the CRT display screen when an electron beam is produced with a constant biasing current. When the intensity of a light spot is modified by video signals applied, the latter are corrected by signals indicative of the intensities or efficiencies of light emission which have previously been stored.

The driver circuit includes a video signal generating circuit 9 for producing a video signal $Sxi$ which will change the intensity of a light spot with which the display screen 3 is scanned in the direction X which extends longitudinally of each phosphor stripe ($Xi$ in the reference character for the video signal represents a position in the direction X). A read-only memory (ROM) 72 stores signals indicative of the intensity of light emission (or efficiency $Ki$ of light emission) as divided (for example, into 1,000 through 10,000 parts) at positions along the direction X of a light spot with which the phosphor stripes 31 through 33 are scanned in the direction X when the CRT is supplied with a constant beam current. A random-access memory (RAM) 73 stores various display data, and may be incorporated in a microprocessor 70.

Figure 13:
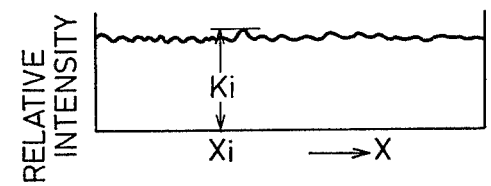
FIG. 13 is a graph indicative of relative intensities of emitted light in the direction of X of phosphor films.

FIG. 13 illustrates an intensity of light emission along a direction X on the phosphor stripe 31, for example, which is scanned with a beam of electrons of a constant intensity in the CRT. The graph of FIG. 13 has an axis X which is in conformity with the direction X along the phosphor stripe 31. The ROM 72 stores signals indicating intensities (or efficiencies) of light emission on the phosphor stripe at positions $Xi$ thereon as data $Ki$ of 64 gradations (6 bits), for instance. Where the phosphor stripes are relatively wide in the direction of Y, efficiencies of light emission at positions $Xi$ on the phosphor stripes may be added in the direction Y before being memorized by the ROM 72. A video amplifier 71 amplifies signals from the microprocessor 70 and delivers an amplified output Z to the CRT. The beam deflection circuit 8 is actuatable by control signals from the microprocessor 70 to control a light spot in order to scan the phosphor stripe 31 in the directions X and Y.

In operation, the microprocessor 70 is supplied successively with the video signals $Sxi$ and the data $Ki$ from the ROM 72 about positions on the phosphor screen for successive arithmetic operations including $Sxi/Ki$. Signals from the microprocessor 70 are supplied through the video amplifier 71 to the CRT in synchronization with sweeping of the electron beam. The video signals delivered to the CRT are thus corrected by the light emission efficiencies of the phosphor stripe at locations thereof along the direction of X, removing shade irregularities due to the uneven light emission efficiencies. More specifically, where the phosphor stripe 31 has a small efficiency of light emission at a position $Xi$ thereon, the video signal is increased in intensity when the light spot hits the position $Xi$ by increasing the biasing current to compensate for the small efficiency of light emission. Such compensating operation is effected at finely divided points on the phosphor stripe along the direction X, thus creating a picture image free of shade irregularities in the direction X.

The data stored in the ROM 72 may be varied as the light emission efficiencies $Ki$ change with time due to deterioration of the phosphor stripe 31. The position in which the electron beam hits the phosphor stripe while the beam is being swept, or the position of the light spot which scans the phosphor stripe, should be in exact agreement with the corresponding location in which the video signal and the data $Ki$ about the light emission efficiency at the position of the phosphor stripe are read out in the microcomputer 70. Such agreement may be provided by detectors disposed at the longitudinal ends of the phosphor stripe 31 for detecting arrival of the light spot, and means may be provided for controlling the beam deflection circuit so as to maintain signals produced from the detectors at constant intervals. The driver circuit thus enables the CRT to generate on photosensitive paper picture images free of exposure irregularities or shade irregularities and stripes.

Although certain preferred embodiments have been shown and described in detail, it should be understood that many changes and modifications may be made therein without departing from the scope of the appended claims.

What is claimed is:

1. A cathode-ray display tube system for color printers, the cathode ray tube having a phosphor screen for producing thereon a light spot which is variable in position and color in response to input signals to expose photo-sensitive color paper, said phosphor screen including:

a blue-emitting phosphor having a maximum ability of color emission in the range of wavelengths of 480 m$\mu$ and below with a radiant energy in the range of wavelengths of about 480 m$\mu$ and higher being 10% or less of the overall radiant energy;

a green-emitting phosphor having a maximum ability of color emission in the range of wavelengths of 520 through 570 m$\mu$ with a radiant energy in the range of wavelengths of about 500 m$\mu$ and less and of about 630 m$\mu$ and higher being 5% or less of the overall radiant energy; and a red-emitting phosphor having a maximum ability of color emission in the range of wavelengths of 630 through 750 m$\mu$ with a radiant energy in the range of wavelengths of about 590 m$\mu$ and less being about 10% or less of the overall radiant energy;

phosphor dots for producing color in a region of wavelengths to which ordinary photosensitive color paper is not sensitive and located beyond the area of normal raster; said tube system further comprising a photoelectric converter coupled to said phosphor dots for detecting light emission from said phosphor dots;

a control circuit coupled to said photoelectric converter which is receptive of at least two pulse signals from said converter for determining the raster scanning condition of said phosphor dots;

and an electron beam deflection circuit for said cathode-ray tube which is controllable by the output of said control circuit.

2. A cathode-ray display tube system according to claim 1, in which said blue-emitting phosphor is of $Ca_2B_5O_9$:Eu, said green-emitting phosphor of $Gd_2O_2S$:Tb, and said red-emitting phosphor of $PbAl_2O_4$:Cr.

3. A cathode-ray display tube system according to claim 1, in which said blue-emitting phosphor is of ZnS:Ag, said green-emitting phosphor of $Y_3Al_5O_{12}$:Ce, and said red-emitting phosphor of CdS:Ag.

4. A cathode-ray display tube system according to claim 1, in which said blue-emitting phosphor is of $Ca_2MgSiO_7$:Ce, said green-emitting phosphor of ZnSAg:Cu, and said red-emitting phosphor of (Zn,Cd)S:Ag.

5. A cathode-ray display tube system according to claim 1, in which said green-emitting phosphor is of $Zn_2SiO_4$:Mn, and said red-emitting phosphor of $BaO.ZnO.2SiO_2$:Mn.

6. A cathode-ray display tube system according to claim 1, in which said blue-emitting phosphor is of $CaB_5O_9C$ :Eu, said green-emitting phosphor of $Y_3Al_5O_{12}$:Ce, and said red-emitting phosphor of (Zn,Cd)S:Ag.

* * * * *